(12) United States Patent
Shapira et al.

(10) Patent No.: US 7,970,022 B2
(45) Date of Patent: Jun. 28, 2011

(54) SURFACE-EMITTING FIBER LASER

(75) Inventors: Ofer Shapira, Cambridge, MA (US); Ken Kuriki, Tochigi (JP); Nicholas D. Orf, Cambridge, MA (US); John D Joannopoulos, Belmont, MA (US); Yoel Fink, Brookline, MA (US); Alexander Stolyarov, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 73 days.

(21) Appl. No.: 12/161,129

(22) PCT Filed: Jan. 19, 2007

(86) PCT No.: PCT/US2007/001704
§ 371 (c)(1),
(2), (4) Date: Feb. 26, 2009

(87) PCT Pub. No.: WO2007/084785
PCT Pub. Date: Jul. 26, 2007

(65) Prior Publication Data
US 2009/0207867 A1 Aug. 20, 2009

(51) Int. Cl.
*H01S 3/30* (2006.01)
*H01S 3/03* (2006.01)
(52) U.S. Cl. .............................................. 372/6; 372/64
(58) Field of Classification Search .................. 372/6, 64
See application file for complete search history.

(56) References Cited

U.S. PATENT DOCUMENTS

| 4,991,179 | A | 2/1991 | Deppe et al. |
| 5,450,232 | A | 9/1995 | Sasaki et al. |
| 5,530,709 | A * | 6/1996 | Waarts et al. ..................... 372/6 |
| 6,404,964 | B1 * | 6/2002 | Bhagavatula et al. ........ 385/123 |
| 6,625,364 | B2 * | 9/2003 | Johnson et al. ............... 385/127 |
| 7,079,748 | B2 * | 7/2006 | Arkhipov et al. ............. 385/141 |
| 7,142,756 | B2 | 11/2006 | Anderson et al. |
| 7,272,285 | B2 | 9/2007 | Benoit et al. |
| 2003/0031852 | A1 | 2/2003 | Fink et al. |
| 2003/0234978 | A1 * | 12/2003 | Garito et al. ............... 359/341.5 |
| 2005/0018714 | A1 | 1/2005 | Fermann et al. |
| 2005/0226579 | A1 | 10/2005 | Fink et al. |
| 2007/0147752 | A1 | 6/2007 | Weisberg et al. |

(Continued)

FOREIGN PATENT DOCUMENTS

JP 03 229476 10/1991

(Continued)

OTHER PUBLICATIONS

International Search Report.

(Continued)

Primary Examiner — Armando Rodriguez
(74) Attorney, Agent, or Firm — Fish & Richardson P.C.

(57) ABSTRACT

In one aspect, the disclosure features an article, including a fiber waveguide extending along a waveguide axis, the fiber waveguide including a core extending along the waveguide axis and a confinement region surrounding the core. The confinement region is configured to guide radiation at a first wavelength, $\lambda_1$, along the waveguide axis and is configured to transmit at least some of the radiation at a second wavelength, $\lambda_2$, incident on the confinement region along a path, where $\lambda_1$ and $\lambda_2$ are different. The core includes a core material selected to interact with radiation at $\lambda_1$ to produce radiation at $\lambda_2$.

28 Claims, 7 Drawing Sheets

U.S. PATENT DOCUMENTS

2007/0163301 A1* 7/2007 Dong et al. ............. 65/393
2009/0097808 A1* 4/2009 Wolfe et al. ............ 385/125

FOREIGN PATENT DOCUMENTS

| | | |
|---|---|---|
| JP | 2004/252057 | 9/2004 |
| WO | WO 01/69313 | 9/2001 |

OTHER PUBLICATIONS

Boas, David A. et al., "Imaging the Body with Diffuse Optical Tomography", IEEE Signal Processing Magazine, pp. 57-75 (Nov. 2001).

Nielsen, M.D. et al., "Low-loss photonic crystal fibers for data transmission and their dispersion properties", Opt. Express 12, 1372 (2004).

Ntziachristos, V. et al., "Fluorescence imaging with near-infrared light: new technological advances that enable in vivo molecular imaging", Eur-Radiol, 13:195-208 (2003).

Verdaasdonk, R.M. and CFP van Swol, "Laser light delivery systems for medical applications", Phys. Med. Biol. 42 869-887 (1997).

International Search Report and Written Opinion from corresponding PCT/US07/01704, dated. Mar. 3, 2008.

Supplementary European Search Report dated May 10, 2010, corresponding to European Patent Appln. No. 07716902.7.

* cited by examiner

SURFACE-EMITTING FIBER LASER

GOVERNMENT LICENSE RIGHTS

This invention was made with government support under grant number HR-0011-04-1-0003 awarded by the Defense Advanced Research Projects agency and grant number N00014-02-1-0717 awarded by the Navy. The government has certain rights in this invention.

CROSS-REFERENCE TO RELATED APPLICATIONS

Under 35 U.S.C. §119(e)(1), this application claims priority to Provisional Patent Application No. 60/760,519, entitled "SURFACE-EMITTING FIBER LASER," filed on Jan. 20, 2006, the entire contents of which is hereby incorporated by reference.

TECHNICAL FIELD

This disclosure relates to fiber lasers.

BACKGROUND

Optical fibers are waveguides with a well-defined axis of propagation that typically include a core and a cladding that surrounds the core. The core material has a higher refractive index than the cladding material, and the optical fiber guides radiation along a waveguide axis by confining the radiation within the core due to total internal reflection of the radiation at the core-cladding interface. Fiber lasers are typically composed of optical fibers in which the core is doped with a gain medium. A pair of reflectors (e.g., mirrors or fiber Bragg gratings) positioned at opposing ends of a length of doped fiber defines an optical cavity in which optical feedback can occur. During operation, the gain medium is pumped, e.g., by pump radiation directed into the core. Radiation emission from the pumped gain medium is amplified through feedback within the optical cavity, while being guided back and forth between the reflectors and confined to the core. Generally, some of this radiation is transmitted by at least one of the reflectors and exits the fiber at an end of the fiber.

SUMMARY

This disclosure relates to fiber lasers which emit laser radiation through their circumference, rather than their end. Embodiments feature a fiber waveguide utilizing a photonic bandgap radiation confinement structure that has a dual purpose of both guiding the pump radiation along the fiber's axis and the confinement of the laser radiation in the transverse direction.

In a first aspect, the disclosure features an article, including a fiber waveguide extending along a waveguide axis, the fiber waveguide including a core extending along the waveguide axis and a confinement region surrounding the core. The confinement region is configured to guide radiation at a first wavelength, $\lambda_1$, along the waveguide axis and is configured to transmit at least some of the radiation (e.g., about 10% or more, about 25% or more, about 50% or more, about 75% or more, about 90% or more) at a second wavelength, $\lambda_2$, incident on the confinement region along a path, where $\lambda_1$ and $\lambda_2$ are different. The core includes a core material selected to interact with radiation at $\lambda_1$ to produce radiation at $\lambda_2$.

Embodiments of the article can include one or more of the following features. For example, the fiber waveguide can be configured to provide stimulated emission of radiation at $\lambda_2$ in a direction orthogonal to the waveguide axis when radiation of sufficient power at $\lambda_1$ is directed to the core. The stimulated emission can be asymmetric with respect to the waveguide axis when the radiation at $\lambda_2$ directed to the core is linearly polarized. For example, the asymmetric emission can have a dipole-shaped intensity pattern with respect to the waveguide axis. The stimulated emission can occur along a portion of the fiber waveguide that extends about $10\lambda_2$ or more along the waveguide axis. In some embodiments, the stimulated emission occurs along a portion of the fiber waveguide that extends about 1 mm or more along the waveguide axis.

The core can have a diameter in a range from 1 µm to about 1,000 µm. The core can be configured to support one or more cavity modes at wavelengths at or near $\lambda_2$. The article can have a quality factor, Q, of about 500 or more for at least one of the modes.

The confinement region can have a plurality of high refractive index regions alternating with low refractive index regions in a direction orthogonal to the waveguide axis. The plurality of low refractive index regions can correspond to holey portions of the confinement regions. In some embodiments, the plurality of alternating high and low refractive index portions correspond to alternating layers of a first material and a second material, the first material having a high refractive index and the second material having a low refractive index. The alternating layers can define a structure having a spiral cross section with respect to the waveguide axis. The spiral structure can include a multilayer structure comprising at least two layers of the different materials encircling the core multiple times. The confinement region can be configured to provide a photonic band gap for radiation at $\lambda_1$. The confinement region can be configured to reflect sufficient radiation at $\lambda_2$ to provide sufficient optical feedback for lasing at $\lambda_2$ when radiation of sufficient power at $\lambda_1$ is directed to the core.

$\lambda_1$ and $\lambda_2$ can be in a range from about 300 nm to about 15,000 nm.

The core material can include a gain medium. The gain medium can be an organic material. The gain medium can include a dye. In some embodiments, the core material includes a matrix material and the gain medium is dispersed in the matrix material. The matrix material can be a polymer. In some embodiments, the core material is a solid material at room temperature. Alternatively, the core material can be a fluid (e.g., a liquid) at room temperature.

The fiber waveguide can include segments where the core is devoid of the core material.

In some embodiments, the article includes a light source configured to produce radiation at $\lambda_1$ and arranged to direct the radiation at $\lambda_1$ into the core. The light source can be a laser light source.

In general, in another aspect, the disclosure features a method that includes providing a fiber waveguide configured to guide radiation at a wavelength $\lambda_1$ along a waveguide axis, the fiber waveguide including a core extending along the waveguide axis having a core material selected to interact with radiation at $\lambda_1$ to produce radiation at $\lambda_2$. The method includes directing radiation at $\lambda_1$ into the core at an intensity sufficient to cause emission of radiation at $\lambda_2$ from the fiber waveguide in a direction orthogonal to the waveguide axis.

In some embodiments, the method can include moving the position of a gain medium in the fiber to vary the position in the fiber which emits the radiation at $\lambda_2$.

The method can be implemented using the article discussed above and can include one or more of the features associated therewith.

Among other advantages, embodiments include fiber lasers that offer control over position, direction, and polarization of the laser emission wavefront. The fiber lasers are inherently scaleable to different wavelengths.

Embodiments can be used for a variety of applications, including remote delivery of radial laser emission.

Furthermore, embodiments allow for control of the position of the gain medium, and hence emission location, along the length of a fiber waveguide.

In certain embodiments, fiber lasers can provide transverse surface laser emission from a large area. Such embodiments can be used, for example, in applications that require low profile laser geometry, such as endoscope phototherapy.

Embodiments can allow simple integration of multi-fiber, large area, low-profile, flexible coherent light source into various articles. For example, fiber lasers can be woven into textiles, providing textiles capable of laser emission.

A number of references are incorporated herein by reference. In case of conflict, the present specification controls. The details of one or more embodiments of the invention are set forth in the accompanying drawings and the description below. Other features and advantages of the invention will be apparent from the description, drawings, and claims.

DESCRIPTION OF DRAWINGS

Like reference symbols in the various drawings indicate like elements.

DETAILED DESCRIPTION

Figure 1A:
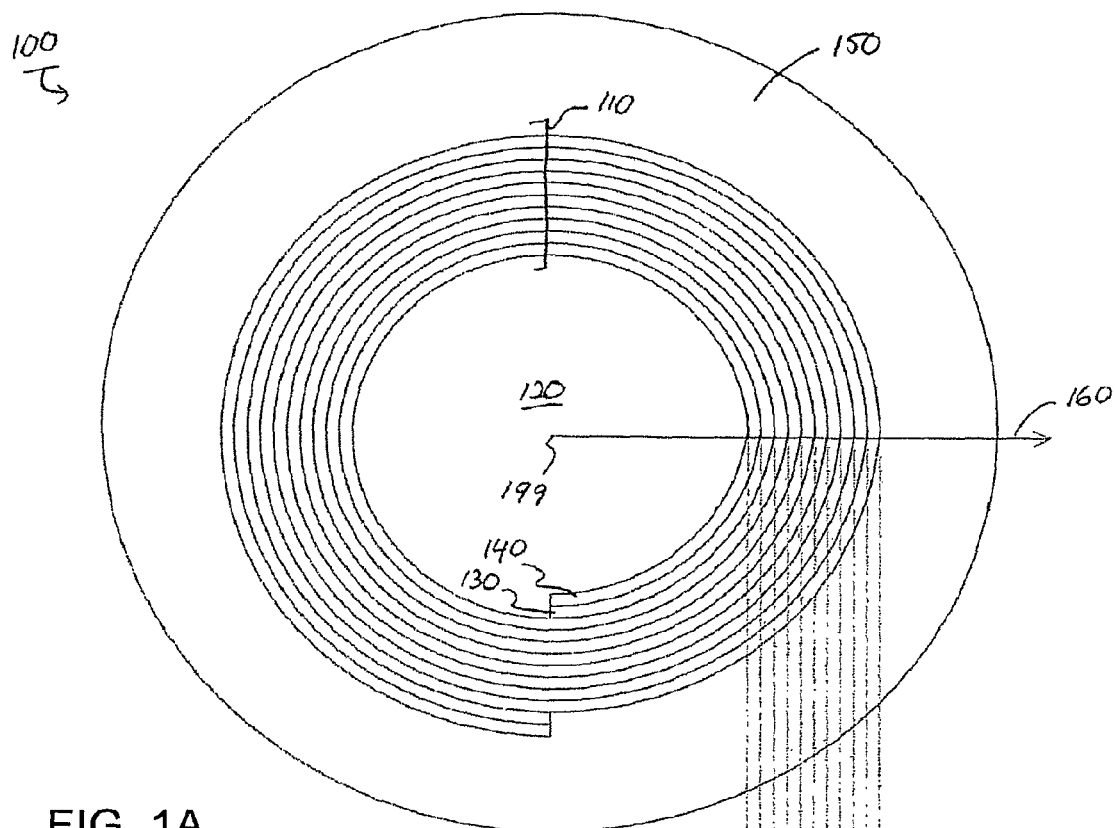
FIG. 1A is a cross-sectional view of an embodiment of fiber laser including a photonic crystal fiber waveguide from a perspective orthogonal to the fiber's waveguide axis.
Figure 1C:
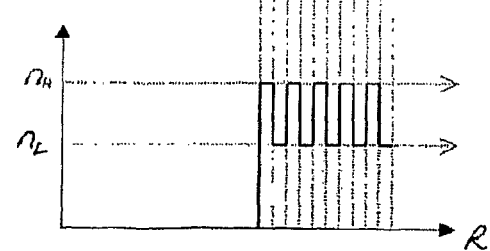
FIG. 1C is a plot of the refractive index profile of a part of the fiber laser shown in FIG. 1A.
Figure 1B:
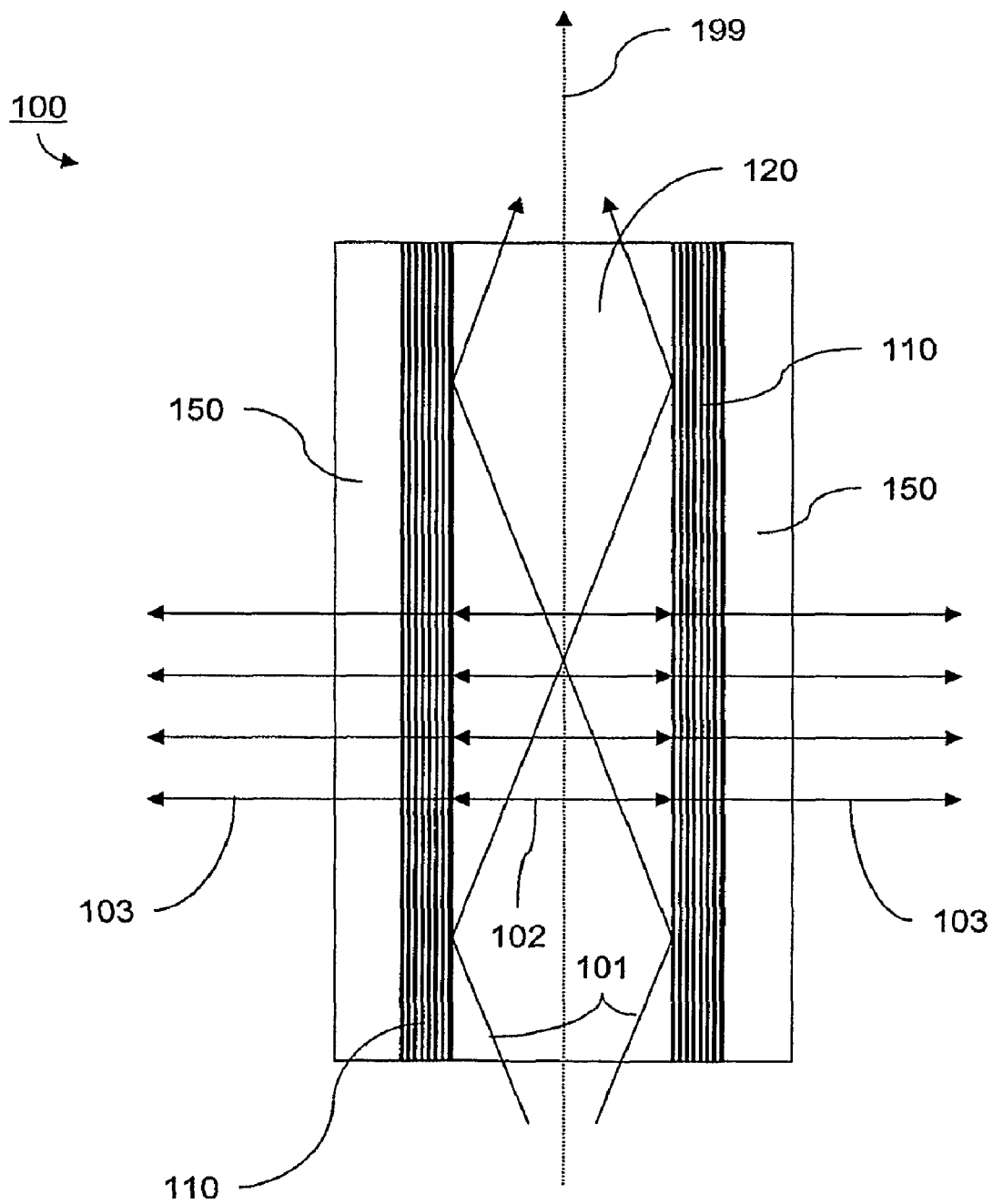
FIG. 1B is a cross-sectional view of the embodiment of the fiber laser shown in FIG. 1A from a perspective parallel to the fiber's waveguide axis.

Referring to FIGS. 1A and 1B, a fiber laser 100 includes a core 120 extending along a waveguide axis and a confinement region 110 (e.g., alternating high index and low index layers) surrounding the core. Confinement region 110 is surrounded by a support layer 150, which provides mechanical support for the confinement region. Core 120 includes a gain medium and a matrix through which the gain medium is dispersed.

During operation, the gain medium in core 120 is pumped by directing radiation at a pump wavelength, $\lambda_p$, through the core. Pump radiation, depicted as rays 101 in FIG. 1B, is confined to core 120 by confinement region 110, and is absorbed by the gain medium. The gain medium emits light at a wavelength $\lambda_1$, at least some of which is reflected by confinement region 110 providing optical feedback. At least some of the emitted radiation is transmitted through the confinement region and exits fiber 100 through fiber's side walls. Radiation at $\lambda_1$ propagating in the radial direction (i.e., orthogonal to waveguide axis 199) is depicted by rays 102 in core 120. The light emitted by fiber laser 100 in the radial direction is depicted by rays 103. Where the intensity of the pump radiation is above the lasing threshold, stimulated emission occurs in the gain medium, and emission from the side of fiber 100 at $\lambda_1$ is laser radiation.

The photonic band gap structure performs a dual role enabled by the characteristic shift of the band edges to shorter wavelengths (higher frequencies) with increase in axial wave vector. The normal incidence bandgap, defined for axial wave vector k=0, provides the optical feedback necessary for achieving lasing action in the radial direction. Concurrently, the blue-shifted bandgap having axial wave vectors near the light line is responsible for guiding the pump radiation.

In general, for normally incident radiation (e.g., radially directed radiation) the photonic band gap structure exhibits a reflection spectrum with high reflectance (e.g., close to 100%) for a band of wavelengths $\Delta\lambda_{pbg}$. $\Delta\lambda_{pbg}$ generally depends on the structure and composition of the confinement region (see discussion below). In order for the confinement region to provide the optical feedback needed for laser emission and at the same time provide sufficient transmission at $\lambda_1$ to allow for coupling of the laser radiation out of fiber's edge, $\Delta\lambda_{pbg}$ should be selected so that the band of wavelengths emitted from the pumped gain medium is overlapped with $\Delta\lambda_{pbg}$.

Accordingly, the gain medium, structure of the confinement region, and pump wavelength are all selected based on the desired laser wavelength, $\lambda_1$, which can be in the ultraviolet, visible, or infrared portions of the electromagnetic spectrum.

In general, $\lambda_p$ depends on the type of gain medium being used. $\lambda_p$ is generally less than $\lambda_1$, and can be in the ultraviolet, visible, or infrared portions of the electromagnetic spectrum. The pump radiation is provided by a pump radiation source capable of producing radiation at $\lambda_p$. In some embodiments, the pump radiation source is a monochromatic source, delivering radiation exclusively at $\lambda_p$. In certain embodiments, the pump radiation source is a broadband source, delivering radiation at multiple wavelengths, including $\lambda_p$. The pump radiation source can be a laser light source (e.g., a solid state laser, a gas laser, a diode laser, a fiber laser) or a regular light source (e.g., a solid state light source such as a light emitting diode, a fluorescent light source, an incandescent light source). Pump radiation can be delivered continuously or in pulses.

Generally, the input power of the pump radiation is selected based on the desired intensity of laser emission from fiber laser 100. Accordingly, the pump radiation is delivered with sufficient power to cause lasing in fiber laser 100 (i.e., above the lasing threshold). Typically, the pump radiation power is below the threshold for damaging the fiber laser.

In general, the pump radiation can be polarized or unpolarized. In certain embodiments, the pump radiation is linearly polarized. Linearly polarized pump radiation can result in anisotropic laser emission in the radial direction. For example, the laser emission can have a dipole-like wavefront oriented, for example, in the polarization direction (i.e., parallel to the electric field vector) of the linearly polarized pump radiation.

Turning now to the structure and composition of fiber laser 100, in general, core 120 has a diameter that can vary as desired. In general, smaller cores will result in higher power density of the pump radiation for a certain input pump power and therefore lower threshold. Accordingly, the core size can be selected based on characteristics of the pump radiation source so that there is a desired power density of pump radiation during operation. Additionally, the core diameter can be selected based on the desired mode characteristics of the guided pump radiation and/or of the emitted radiation. In some embodiments, the core diameter is selected so that the fiber is a single mode fiber for $\lambda_p$.

In embodiments, the core diameter can be on the order of about $\lambda_p$. Alternatively, in certain embodiments, the core diameter can be larger $\lambda_p$, such as about 5 $\lambda_p$ or more (e.g., about 10$\lambda_p$ or more, about 20$\lambda_p$ or more, about 30$\lambda_p$ or more, about 40 $\lambda_p$ or more, about 50 $\lambda_p$ or more, about 100 $\lambda_p$ or more). In some embodiments, the core diameter is in a range from about 1 µm to about 1,000 µm (e.g., about 10 µm or more, about 50 µm or more, about 100 µm or more, about 500 µm or less, about 200 µm or less).

The power density of the pump radiation should be above the threshold power required for lasing, but should be below the threshold for which the fiber is damaged.

In general, the gain medium is selected based on the desired emission wavelength, $\lambda_1$. The gain medium can be an organic or inorganic gain medium. Examples of organic gain media include organic dyes, such as LDS698, DCM, coumarin 503, coumarin 500, coumarin 540A, rhodamine 590, oxazine 720, oxazine 725, and LD700 (all commercially available from Exciton, Inc., Dayton, Ohio), quantum dots, conjugated polymers. Examples of inorganic gain media include the rare-earth ions: Erbium, Neodymium, and Praseodymium.

As mentioned above, in fiber laser 100 the gain medium is dispersed in a matrix material. In general, the matrix material can vary as desired. Typically, the matrix material is selected based on its compatibility with the gain medium and with the processes used in the formation of the fiber laser. Matrix materials are also selected based on their optical properties, particularly at $\lambda_p$ and $\lambda_1$. For example, matrix materials typically should have relatively low absorption at $\lambda_p$ and $\lambda_1$. Matrix materials can include solid or liquid materials. Examples of solid matrix materials include polymers (e.g., homopolymers or copolymers) and inorganic glasses. Examples of liquid matrix materials include water and organic liquids.

In general, the concentration of the gain medium in the matrix material can vary as desired. Generally, the higher the concentration of the gain medium, the lower the threshold input power required for lasing. For some gain media, such as certain organic dyes, for very high concentration, the physical proximity of the molecules can result in degraded emission. In some embodiments, the concentration of the gain medium is 10 ppm or more (e.g., about 50 ppm or more, about 100 ppm or more, about 500 ppm or more, about 1,000 ppm or more).

Turning now to the structure and composition of the confinement region, confinement region 110 includes continuous alternating layers 130 and 140 of materials (e.g., polymer, glass) having different refractive indices. Continuous layers 130 and 140 form a spiral around an axis 199 along which the photonic crystal fiber waveguide guides electromagnetic radiation. One of the layers, e.g., layer 140, is a high-index layer having an index $n_H$ and a thickness $d_H$, and the layer, e.g., layer 130, is a low-index layer having an index $n_L$ and a thickness $d_L$, where $n_H > n_L$ (e.g., $n_H - n_L$ can be greater than or equal to or greater than 0.01, 0.05, 0.1, 0.2, 0.5 or more). Because layers 130 and 140 spiral around axis 199, a radial section 160 extending from axis 199 intersects each of the layers more than once, providing a radial profile that includes alternating high index and low index layers.

Referring to FIG. 1C, optically, the spiraled layers provide a periodic variation in the index of refraction along radial section 160, with a period corresponding to the optical thickness of layer 130 and layer 140, i.e., confinement region 110 has an bilayer optical period $n_H d_H + n_L d_L$.

In general, the thickness ($d_H$ and $d_L$) and optical thickness ($n_H d_H$ and $n_L d_L$) of layers 130 and 140 can vary depending on the desired optical characteristics of the confinement region. In some embodiments, the optical thickness of layer 130 and layer 140 are the same. Layer thickness is usually selected based on the desired optical performance of the fiber (e.g., according to the $\lambda_p$ and $\lambda_1$). The relationship between layer thickness and optical performance is discussed below. Typically, layer thickness is in the sub-micron to tens of micron range. For example, layers 130 and 140 can be between about 0.1 µm to 20 µm thick (e.g., about 0.5 to 5 µm thick).

In general, confinement region 110 may include different numbers of bilayers (e.g., about 10 or more bilayers, about 20 or more bilayers, about 30 or more bilayers, about 40 or more bilayers).

In general, layer 140 includes a material that has a high refractive index, such as a chalcogenide glass. Layer 130 includes a material having a refractive index lower than the high index material of layer 140, and is typically mechanically flexible. For example, layer 130 can be formed from a polymer, such as PEI. Preferably, the materials forming layer 130 and layer 140 can be co-drawn.

Regarding the composition of layers 130 and 140 in confinement region 110, materials with a suitably high index of refraction to form a high index portion (e.g., layer 140) include chalcogenide glasses (e.g., glasses containing a chalcogen element, such as sulphur, selenium, and/or tellurium), heavy metal oxide glasses, amorphous alloys, and combinations thereof.

In addition to a chalcogen element, chalcogenide glasses may include one or more of the following elements: boron, aluminum, silicon, phosphorus, sulfur, gallium, germanium, arsenic, indium, tin, antimony, thallium, lead, bismuth, cadmium, lanthanum and the halides (fluorine, chlorine, bromide, iodine).

Chalcogenide glasses can be binary or ternary glasses, e.g., As—S, As—Se, Ge—S, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—S—Tl, As—Se—Tl, As—Te—Tl, As—Se—Ga, Ga—La—S, Ge—Sb—Se or complex, multi-component glasses based on these elements such as As—Ga—Ge—S, Pb—Ga—Ge—S, etc. The ratio of each element in a chalcogenide glass can be varied. For example, a chalcogenide glass with a suitably high refractive index may be formed with 5-30 mole % Arsenic, 20-40 mole % Germanium, and 30-60 mole % Selenium.

Examples of heavy metal oxide glasses with high refractive indices include $Bi_2O_3$—, PbO—, $Tl_2O_3$—, $Ta_2O_3$—, $TiO_2$—, and $TeO_2$— containing glasses.

Amorphous alloys with suitably high indices of refraction include Al—Te, R—Te(Se) (R=alkali).

Materials with suitably low index of refraction to form a low-index portion (e.g., layer 130) include oxide glasses, halide glasses, polymers, and combinations thereof. Polymers including those in the carbonate- (e.g., polycarbonate (PC)), sulfone- (e.g., poly(ether sulphone) (PES)), etherimid- (e.g., poly(etherimide) (PEI)), and acrylate- (e.g., poly(methyl methacrylate) (PMMA)) families as well as fluoropolymers are good matching candidates too.

Suitable oxide glasses may include glasses that contain one or more of the following compounds: 0-40 mole % of $M_2O$ where M is Li, Na, K, Rb, or Cs; 0-40 mole % of M'O where M' is Mg, Ca, Sr, Ba, Zn, or Pb; 0-40 mole % of $M''_2O_3$ where M" is B, Al, Ga, In, Sn, or Bi; 0-60 mole % $P_2O_5$; and 0-40 mole % $SiO_2$.

Portions of fiber lasers can optionally include other materials. For example, any portion can include one or more materials that change the index of refraction of the portion. A portion can include a material that increases the refractive index of the portion. Such materials include, for example, germanium oxide, which can increase the refractive index of a portion containing a borosilicate glass. Alternatively, a portion can include a material that decreases the refractive index of the portion. For example, boron oxide can decrease the refractive index of a portion containing a borosilicate glass.

Portions of fiber lasers can be homogeneous or inhomogeneous. For example, one or more portions can include nanoparticles (e.g., particles sufficiently small to minimally scatter light at guided wavelengths) of one material embedded in a host material to form an inhomogeneous portion. An example of this is a high-index polymer composite formed by embedding a high-index chalcogenide glass nano-particles in a polymer host. Further examples include CdSe and or PbSe nano-particles in an inorganic glass matrix.

Portions of fiber waveguides can include materials that alter the mechanical, rheological and/or thermodynamic behavior of those portions of the fiber. For example, one or more of the portions can include a plasticizer. Portions may include materials that suppress crystallization, or other undesirable phase behavior within the fiber. For example, crystallization in polymers may be suppressed by including a cross-linking agent (e.g., a photosensitive cross-linking agent). In other examples, if a glass-ceramic material was desired, a nucleating agent, such as $TiO_2$ or $ZrO_2$, can be included in the material.

Portions can also include compounds designed to affect the interface between adjacent portions in the fiber (e.g., between the low index and high index layers). Such compounds include adhesion promoters and compatibilizers. For example, an organo-silane compound can be used to promote adhesion between a silica-based glass portion and a polymer portion. For example, phosphorus or $P_2O_5$ is compatible with both chalcogenide and oxide glasses, and may promote adhesion between portions formed from these glasses.

When making a robust fiber waveguides using a drawing process, not every combination of materials with desired optical properties is necessarily suitable. Typically, one should select materials that are rheologically, thermo-mechanically, and physico-chemically compatible. Further discussion of co-drawing photonic crystal fiber waveguides can be found in U.S. patent application Ser. No. 10/196,403, entitled "METHOD OF FORMING REFLECTING DIELECTRIC MIRRORS," filed on Jul. 16, 2002, and in U.S. patent application Ser. No. 10/733,873, entitled "FIBER WAVEGUIDES AND METHODS OF MAKING SAME," filed on Dec. 10, 2003, the entire contents both of which are incorporated herein by reference.

Confinement region 110 guides radiation in a first range of wavelengths to propagate in dielectric core 120 along waveguide axis 199. The confinement mechanism is based on a photonic crystal structure in region 110 that forms a bandgap including the first range of wavelengths. Because the confinement mechanism is not index-guiding, it is not necessary for the core to have a higher index than that of the portion of the confinement region immediately adjacent the core. To the contrary, core 120 may have a lower average index than that of confinement region 110.

Layers 130 and 140 of confinement region 110 form what is known as a Bragg fiber. The periodic optical structure of the spirally wound layers are analogous to the alternating layers of a planar dielectric stack reflector (which is also known as a Bragg mirror). The layers of confinement region 110 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a structure with a refractive index modulation that produces a photonic bandgap in the photonic crystal. A photonic bandgap, as used herein, is a range of wavelengths (or inversely, frequencies) in which there are no accessible extended (i.e., propagating, non-localized) states in the dielectric structure. Typically the structure is a periodic structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for wavelengths both below and above the gap, allowing light to be confined even in lower-index regions (in contrast to index-guided TIR structures, such as those described above). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wave vector $\beta$ is conserved, so only states with a given $\beta$ need to be excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the reflector formed from the stack of layers is highly reflective in the photonic bandgap because EM radiation cannot propagate through the stack. Similarly, the layers in confinement region 110 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In theory, however, the rate of such tunneling decreases exponentially with photonic crystal thickness (e.g., the number of alternating layers). It also decreases with the magnitude of the index-contrast in the confinement region.

Furthermore, a photonic bandgap may extend over only a relatively small region of propagation vectors. For example, a layer stack may be highly reflective for a normally incident ray and yet only partially reflective for an obliquely incident ray. A "complete photonic bandgap" is a bandgap that extends over all possible wave vectors and all polarizations. Generally, a complete photonic bandgap is only associated with a photonic crystal having index modulations along three dimensions.

In a Bragg-like configuration such as confinement region 110, the high-index layers may vary in index and thickness, and/or the low-index layers may vary in index and thickness. The confinement region may also include a periodic structure including more than two layers per period (e.g., three or more layers per period). Moreover, the refractive index modulation may vary continuously or discontinuously as a function of fiber radius within the confinement region. In general, the confinement region may be based on any index modulation that creates a photonic bandgap.

In the present embodiment, multilayer structure 110 forms a Bragg reflector because it has a periodic index variation with respect to the radial axis. A suitable index variation is an approximate quarter-wave condition. It is well-known that, for normal incidence, a maximum band gap is obtained for a "quarter-wave" stack in which each layer has equal optical thickness $\lambda/4$, or equivalently $d_H/d_L = n_L/n_H$, where d and n refer to the thickness and index, respectively, of the high-index and low-index layers. These correspond to layers 240 and 230, respectively. Normal incidence corresponds to $\beta=0$. For a cylindrical waveguide, the desired modes typically lie near the light line $\omega=c\beta$ (in the large core radius limit, the lowest-order modes are essentially plane waves propagating along z-axis, i.e., the waveguide axis). In this case, the quarter-wave condition becomes:

$$\frac{d_H}{d_L} = \frac{\sqrt{n_L^2 - 1}}{\sqrt{n_H^2 - 1}}$$

Strictly speaking, this equation may not be exactly optimal because the quarter-wave condition is modified by the cylindrical geometry, which may require the optical thickness of each layer to vary smoothly with its radial coordinate. Nonetheless, we find that this equation provides an excellent guideline for optimizing many desirable properties, especially for core radii larger than the mid-bandgap wavelength.

While confinement region 110 includes a multilayer structure that is wrapped around the core multiple times to provide a spiral structure, other configurations are also possible. For example, in some embodiments, the confinement region can include annular layers as an alternative or in addition to the spiral layers. In certain embodiments, the confinement region can include a two-dimensional refractive index modulation. For example, holey fibers such as those described by M. D. Nielsen et al. in "Low-loss photonic crystal fibers for data transmission and their dispersion properties," Opt. Express 12, 1372, (2004), can be used.

As discussed previously, support layer 150 provides mechanical support for confinement region 110. The thickness of support layer 150 can vary as desired. In some embodiments, support layer 150 is substantially thicker than confinement region 110. For example, support layer 150 can be about 10 or more times thicker than confinement region 110 (e.g., more than about 20, about 30, or about 50 times thicker).

In general, the composition of support layer 150 is usually selected to provide the desired mechanical support and protection for confinement region 110, while at the same time being sufficiently transparent at $\lambda_1$ to allow the laser radiation to be emitted by the side of the fiber. In certain embodiments, support layer 150 is formed from materials that can be co-drawn with the confinement region 110. In some embodiments, support layer can be formed from the same material(s) as used to form confinement region 110. For example, where layer 130 is formed from a polymer, support layer 150 can be formed from the same polymer.

In general, fiber lasers can be made in a variety of different ways. In some embodiments, fiber lasers, such as laser 100, can be made by rolling a planar multilayer article into a spiral structure and drawing a photonic crystal fiber from a preform derived from the spiral structure. After drawing, a gain medium can be introduced into the hollow core of the fiber.

Figure 2A:
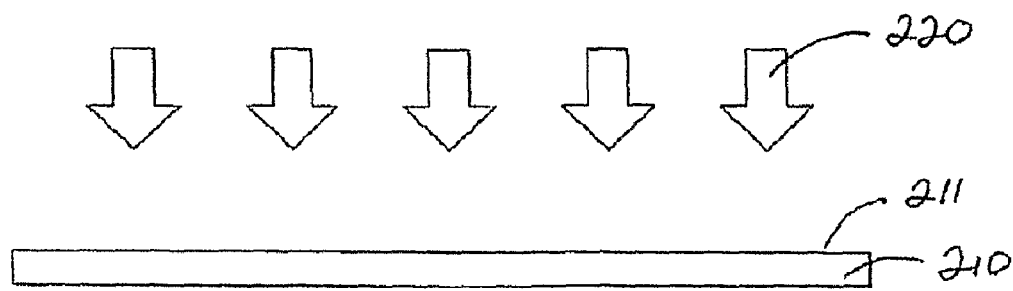
FIG. 2A-2D are schematic diagrams showing steps in a method for making a fiber laser.
Figure 2B:
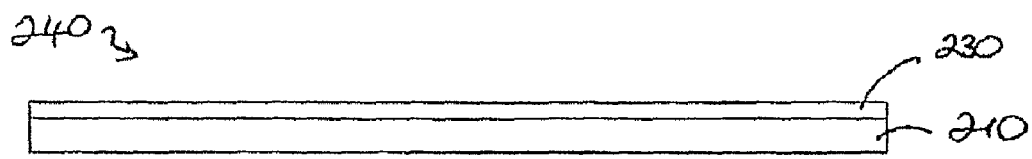

Referring to FIG. 2A, to prepare a preform, a glass is deposited 220 on a surface 211 of a polymer film 210. The glass can be deposited by methods including thermal evaporation, chemical vapor deposition, or sputtering. Referring to FIG. 2B, the deposition process provides a multilayer article 240 composed of a layer 230 of glass on polymer film 210.

Figure 2C:
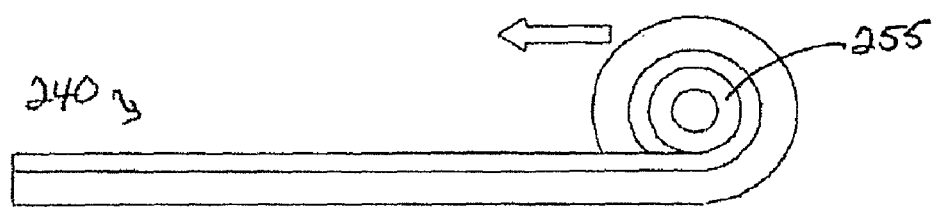
Figure 2D:
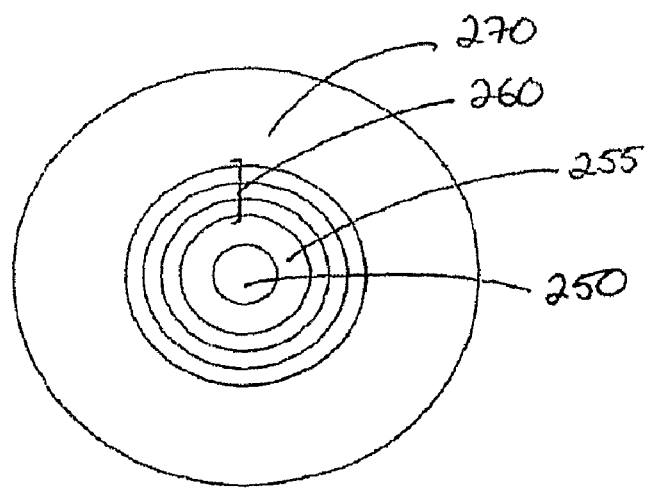

Referring to FIG. 2C, following the deposition step, multilayer film 240 is rolled around a mandrel 255 (e.g., a hollow glass, such as a borosilicate glass, or polymer tube) to form a spiral tube. A number (e.g., about three to ten) of polymer films are then wrapped around the spiral tube to form a preform wrap. In some embodiments, the polymer films are made from the same polymer or glass used to form multilayer article. Under vacuum, the preform wrap is heated to a temperature above the glass transition temperature of the polymer (s) and glass(es) forming multilayer film 240 and the films wrapped around the spiral tube. The preform wrap is heated for sufficient time for the layers of the spiral tube to fuse to each other and for the spiral tube to fuse to polymer films wrapped around it. The temperature and length of time of heating depends on the preform wrap composition. Where the multilayer is composed of $As_2S_3$ and PEI and the wrapping films are composed of PEI, for example, heating for 15-20 minutes (e.g., about 18 minutes) at 200-350° C. (e.g., about 260° C.) is typically sufficient. The heating fuses the various layers to each other, consolidating the spiral tube and wrapping films. The consolidated structure is shown in FIG. 2D. The spiral tube consolidates to a multilayer region 260 corresponding to rolled multilayer film 240. The wrapped polymer films consolidate to a monolithic support cladding 270. The consolidated structure retains a hollow core 250 of mandrel 255.

As an alternative to wrapping polymer films around the spiral tube to provide support cladding 270, the spiral tube can be inserted into a hollow tube with inner diameter matching the outer diameter of the spiral tube.

Mandrel 255 is removed from the consolidated structure to provide a hollow preform that is then drawn into a fiber. The preform has the same composition and relative dimensions (e.g., core radius to thickness of layers in the confinement region) of the final fiber. The absolute dimensions of the fiber depend on the draw ratio used. Long lengths of fiber can be drawn (e.g., up to thousands of meters). The drawn fiber can then be cut to the desired length.

Preferably, consolidation occurs at temperatures below the glass transition for the mandrel so that the mandrel provides a rigid support for the spiral tube. This ensures that the multilayer film does not collapse on itself under the vacuum. The mandrel's composition can be selected so that it releases from the innermost layer of the multilayer tube after consolidation. Alternatively, where the mandrel adheres to the innermost layer of the multilayer tube during consolidation, it can be removed chemically, e.g., by etching. For example, in embodiments where the mandrel is a glass capillary tube, it can be etched, e.g., using hydrofluoric acid, to yield the preform.

In some embodiments, glass can be coated on both sides of polymer film 210. This can be advantageous because the each glass layer only needs to be half as thick as a glass layer deposited on one side only. Thinner glass layers are typically less susceptible to mechanical stress damage that can occur during rolling.

In some embodiments, two or more multilayer films can be prepared and stacked before rolling. In this way, the number of layers in the confinement region can be increased without increasing the size of the film.

The gain medium can be introduced into the core before or after drawing the fiber from the preform. In some embodiments, for example, the gain medium can be introduced into the preform and co-drawn with the fiber. In such cases, the matrix material should be a material that can be co-drawn with the materials used to form the other portions of the fiber.

Alternatively, the gain medium can be introduced into the hollow core of the fiber after it has been drawn. For example, the matrix material can be in liquid form with the gain medium dispersed or dissolved therein prior to introduction into the core. The liquid can be introduced into the core at one end of the fiber and then drawn into the fiber with capillary action or under pressure. Optionally, the matrix material can be solidified after introduction into the core. For example, in certain embodiments, the matrix material can be solidified by cooling the material. Alternatively, or additionally, the matrix material can be polymerized (e.g., by exposure to actinic radiation or heat) once it is positioned in the fiber core.

Figure 3:
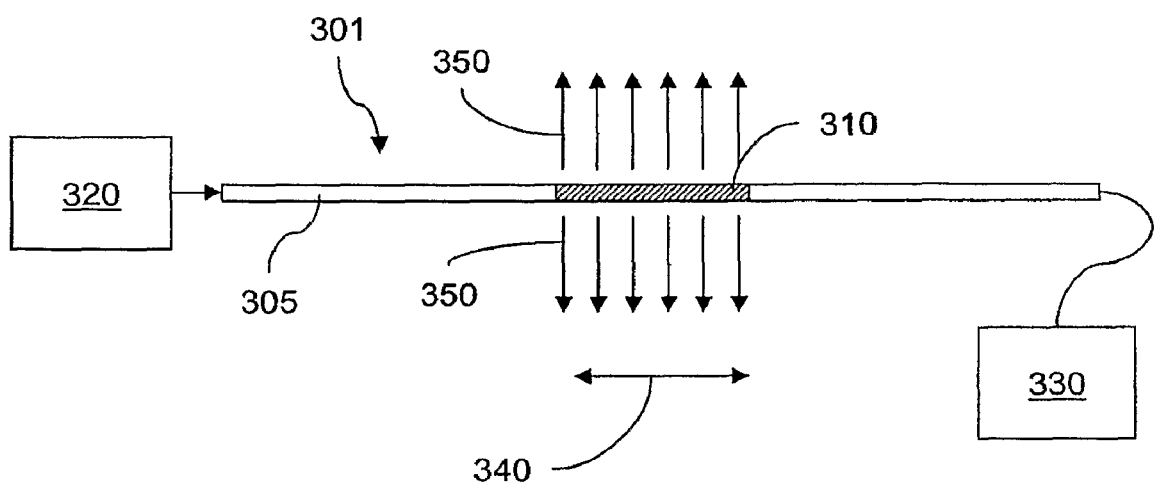
FIG. 3 is a schematic diagram of a system including an edge-emitting fiber laser.

In general, gain medium can be inserted into the core of a photonic crystal fiber along its entire length or just a portion or portions of the fiber's length. Additionally, the gain medium can be in a solid phase, liquid phase, or gas phase. The phase of the gain medium can also change with time within the fiber. In some embodiments, the position of the gain medium in the fiber can be adjustably positioned along the fiber's length, before, during, and/or after operation of the fiber laser. For example, referring to FIG. 3, a system 300 includes a fiber laser 301, a pump radiation source 320 (e.g., a laser), and a pressure varying device 330 coupled to an end of the fiber laser. Fiber laser 301 includes a length of photonic crystal fiber 305, a portion 310 of which includes a gain medium in the core. During operation, pump radiation source 320 delivers pump radiation 321 to fiber laser 301. The pump radiation interacts with the gain medium in portion 310 producing laser radiation 350 which is emitted from the edge of fiber laser 301. The gain medium is dispersed in a matrix which can be repositioned in the fiber depending on the pressure in the fiber. Accordingly, during operation, a user can vary the pressure in the fiber using pressure varying device 330, thereby changing the location of the gain medium in the fiber. For example, in order to move the gain medium further from the end of the fiber coupled to device 330, the device can be operated to increase the pressure in the fiber. Alternatively, to move the gain medium further from pump radiation source 320, device 330 can be used to reduce the pressure in the fiber's core, drawing the gain medium closer to device 330.

In some embodiments, the gain medium exists in a core that is otherwise hollow (as in FIG. 3), or as a plug positioned between other materials. For example, a liquid gain medium could be sandwiched in another fluid within the fiber in which the gain medium is immiscible. In certain embodiments, motion of the gain medium can be achieved by controlling the pressure within the fiber's core from both ends of the fiber (e.g., by applying positive pressure to both ends of the fiber).

Figure 4:
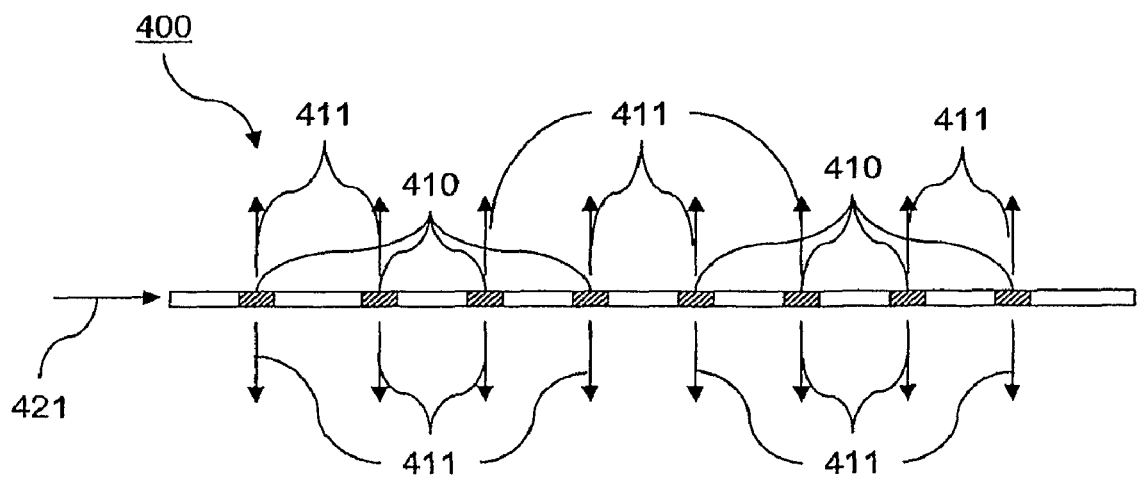
FIG. 4 is a schematic of a fiber laser including multiple discrete portions which emit laser radiation.

Referring to FIG. 4, an example of a system which includes a fiber having a gain medium at multiple discrete locations along its length is system 400. System 400 includes a photonic crystal fiber 401 having portions 410 which include the gain medium. The other portions of photonic crystal fiber 401 do not include sufficient gain medium to provide laser radiation during the systems operation. Accordingly, during operation, pump radiation 421 introduced into the fiber interacts with the gain medium in portions 410 to produce laser radiation 411 which is emitted from the edge of the fiber.

In general, the gain medium in each portion 410 can be the same or different as in other portions. For example, in certain embodiments, different portions can lase at different wavelengths by utilizing different gain media, thereby providing a fiber laser that emits different colored radiation along its length.

Fiber lasers such as those described above can be used in a variety of applications. For example, they can be used in display applications. In certain embodiments, the fiber waveguide can be shaped into a desired form, and then pumped to provide an emissive display.

In some embodiments, fiber lasers can be used as a component in textiles. For example, fibers can be woven into a fabric which can then be used to in clothing or other textile applications. During use, pump radiation can be delivered to the fiber in the fabric, providing emission of laser radiation from the fabric.

Fiber lasers can also be used in medical applications. For example, in some embodiments, fiber lasers can be used as a light source for diffuse optical tomography (DOT). DOT involves illuminating biological tissue with an array of light sources and measuring light leaving the tissue with an array of detectors. For each source location, one records an image of the light reaching each detector from that source position. Information about the tissue is then determined based on a model of the propagating of the light in the tissue. DOT is described, for example, by David A. Boas et al., in "Imaging the Body with Diffuse Optical Tomography," IEEE Signal Processing Magazine, pp. 57-75 (November 2001), the entire contents of which is hereby incorporated by reference.

As another example, fiber lasers can be used as light sources for fluorescence molecular tomography in which the emission of near-infrared excited fluorochromes is used to tomographically reconstruct a three-dimensional organism. Examples of this technique are described by V. Ntziachristos et al. in "Fluorescence imaging with near-infrared light: new technological advances that enable in vivo molecular imaging," Eur. Radiol. (2003) 13:195-208, the entire contents of which is incorporated herein by reference.

In both DOT and fluorescence molecular tomography improvement in the reconstruction resolution can be achieved by using a denser array of sources, which can be provided using fiber lasers configured as a flexible large-area laser that can form any shape and is effectively a large number of point sources.

Fiber lasers can be used for photodynamic therapy (also called photoradiation therapy, phototherapy, or photochemotherapy) in which light is used to activate an agent that destroys, e.g., cancer cells. While the agent can be injected into the body and travel anywhere, it is more difficult to illuminate internal regions than external regions. Using an endoscope, for example, a fiber laser can be used to deliver light to internal locations. An exemplary use is described by R. M. Verdaasdonk and C. F. P. van Swol in "Laser light delivery systems for medical applications," Phys. Med. Biol. 42 869-887 (1997), the entire contents of which is incorporated herein by reference.

Fiber lasers can also be used in applications where control over the emission direction is desired, e.g., without mechanically moving the laser or part of it. Additionally, the coherent radiation from fiber lasers could be used to detect specific biological or chemical gases, which are traced by specific molecular transitions that match the laser radiation field.

Examples

A variety of fiber lasers were produced as follows. A hollow-core photonic bandgap fiber preform was fabricated by thermal evaporation of an $As_2S_3$ layer (5 μm thick) on both sides of a free-standing 8 μm thick PEI film and the subsequent rolling of the coated film into a hollow multilayer tube. This hollow macroscopic preform with a thick protective outer layer of PEI was consolidated by heating under vacuum at approximately 260° C. and was then drawn in a fiber draw tower into hundreds of meters of fiber at approximately 305° C. Three different fibers were drawn from the preform, one having a fundamental reflection bandgap at approximately 500 nm, one having a fundamental reflection bandgap at approximately 600 nm, and one having a fundamental reflection bandgap at approximately 690 nm.

Mixed solutions of methyl methacrylate (MMA) and 2-hydroxyethyl methacrylate (HEMA) monomers containing t-butyl peroxide (tBP) or azobisisobutyronitrile (AIBN), n-butyl mercaptan, and organic dyes (0.05-0.5 wt. %) were prepared and inserted into the hollow core photonic bandgap fibers. The fibers were placed in an oven at either 90° C. (tBP) or 60° C. (AIBN) for 20 hours for polymerization. All dyes were obtained from Exciton, Inc. The dyes used were as follows: (1), 0.5 wt. % coumarin 503; (2) 0.5 wt. % coumarin 500; (3) 0.5 wt. % coumarin 540A; (4) 0.1 wt. % rhodamine 590; (5) 0.1 wt. % DCM; (6) 0.1 wt. % LDS698; (7) oxazine 720; (8) 0.1 wt. % LD700; (9) 0.1 wt. % oxazine 725. Dyes (1)-(3) were placed in fibers having a fundamental reflection bandgap at approximately 500 nm. Dye (4) was placed in a fiber having a fundamental reflection bandgap at approximately 600 nm. Dyes (5)-(9) were placed in fibers having a fundamental reflection bandgap at approximately 690 nm.

The optical pump for the fiber lasers was a linearly polarized, pulsed Nd:YAG laser (Continuum Minilite II) with nominal pulse durations of 9 ns and repetition rate of 10 Hz. Both the second (532 nm) and third (355 nm) harmonics were utilized as pumps in accordance with the dye's fluorescence. The pump beam was spatially filtered by a 500 μm pinhole, a small percentage of the energy was directed away by a beam splitter to monitor the pump energy, a half-wavelength plate controlled the pump polarization, and a one-inch focal-length lens coupled the pump into the fiber core. The pump input energy was measured using an energy meter (Coherent PM 1000, 54-09 and J3S-10). The energy of the resulting laser light emitted from the fiber laser was collected by an integrating sphere (obtained from Sphere Optics) and measured using the same energy meter with a high-pass filter mounted in front to eliminate any pump signal. The pump energy was adjusted using a variable optical attenuator. The emission spectra of the generated laser light were measured with the spectrometer after being collected by a 600 μm-diameter multimode fiber probe.

Figure 5:
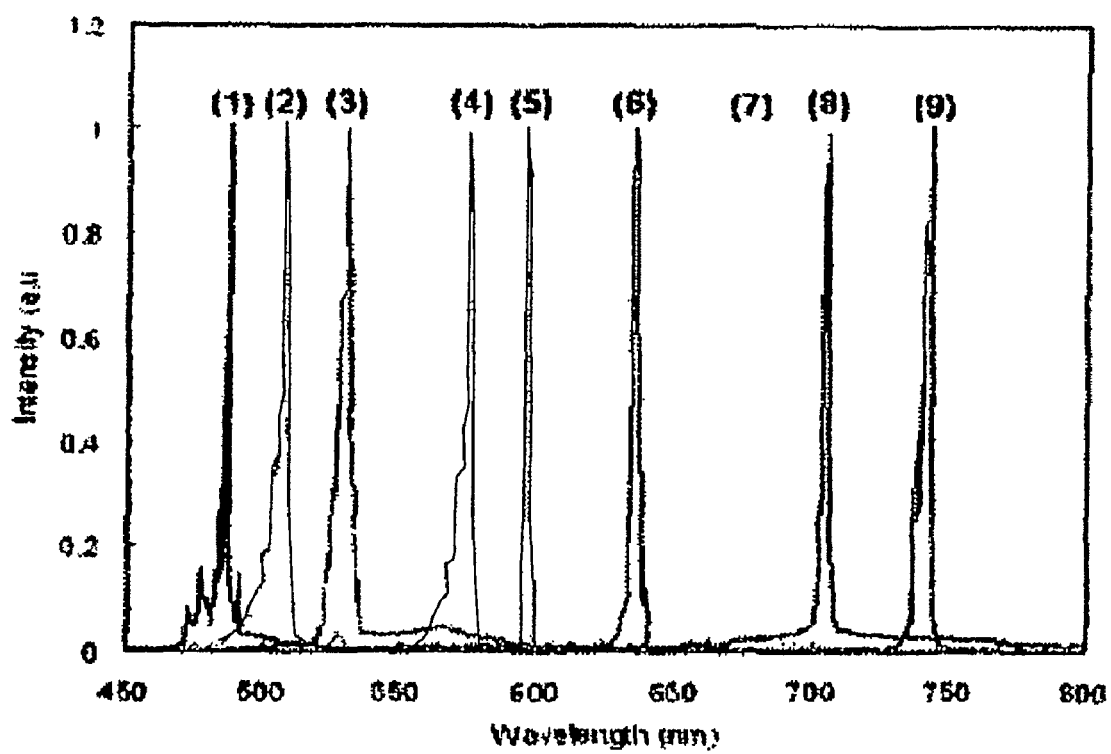
FIG. 5 is a plot of emission spectra of fiber lasers including different gain media.

Referring to FIG. 5, laser emission spectra from the fibers is shown. The numbering of spectra corresponds to the dye numbering used above. The fibers yielding spectra (1)-(3) were pumped with radiation at 355 nm. The fibers yielding spectra (4)-(9) were pumped with radiation at 532 nm.

Figure 6A:
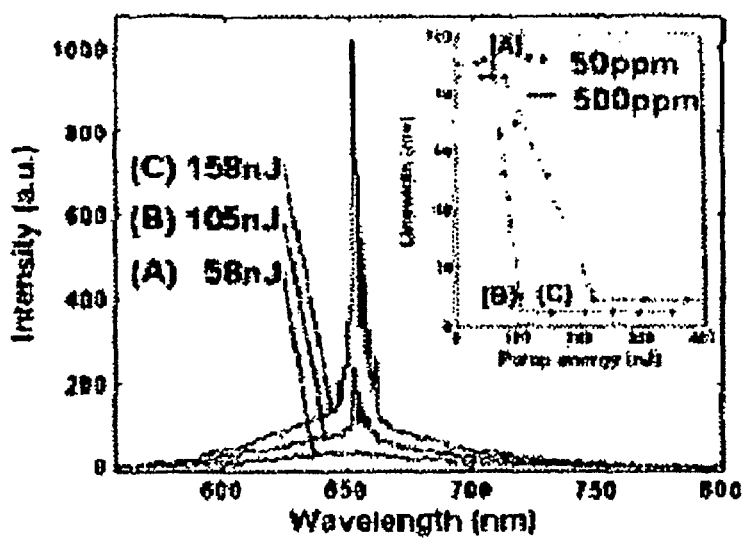
FIG. 6A is a plot showing emission from a fiber laser at different pump radiation intensities.
Figure 6B:
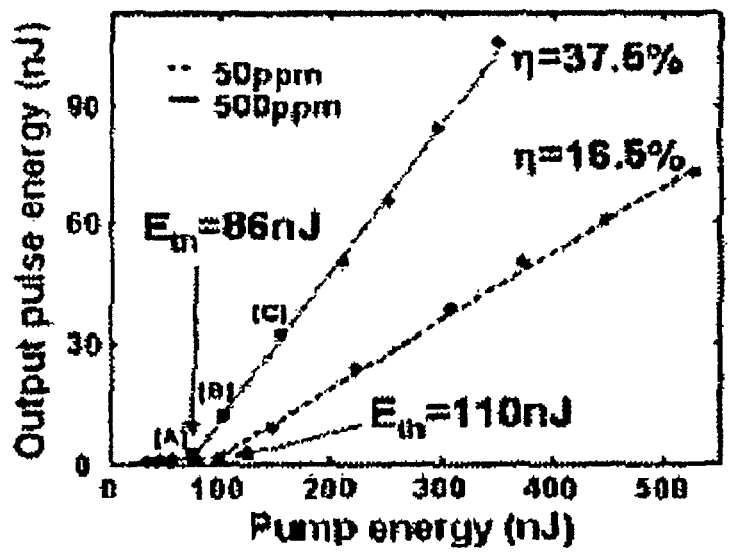
FIG. 6B is a plot showing emission energy as a function of pump intensity for fiber lasers including the same dye at different concentrations.
Figure 6C:
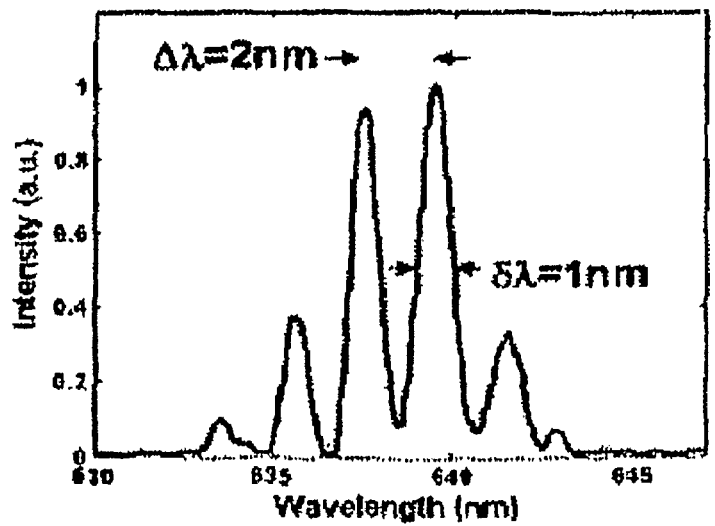
FIG. 6C is an emission spectrum of a fiber laser.

Referring to FIGS. 6A-6C, the lasing characteristics of the fiber laser using LDS698 as its gain medium is shown. FIG. 6A shows emission spectra of the fiber laser for a dye concentration of 500 ppm and a pump energy below threshold (curve (A)), at $1.2 E_{th}$ (curve (B)), and at $1.8 E_{th}$ (curve (C)), where $E_{th}$ is the lasing threshold energy. The inset plot in FIG. 6A shows the spectral full-width at half-maximum as a function of pump energy for different dye concentrations (50 ppm and 500 ppm, respectively). FIG. 6B shows the dependence of laser energy on pump energy. In particular, FIG. 6B shows Eth=86 nJ and Eth=100 nJ for fiber lasers with dye concentrations 50 ppm and 500 ppm, respectively. FIG. 6C shows a high resolution plot of emission intensity as a function of wavelength for the fiber laser have a dye concentration of 500 ppm. The spectrum reveals mode spacing of approximately 2 nm and a quality factor of 640.

Figure 7A:
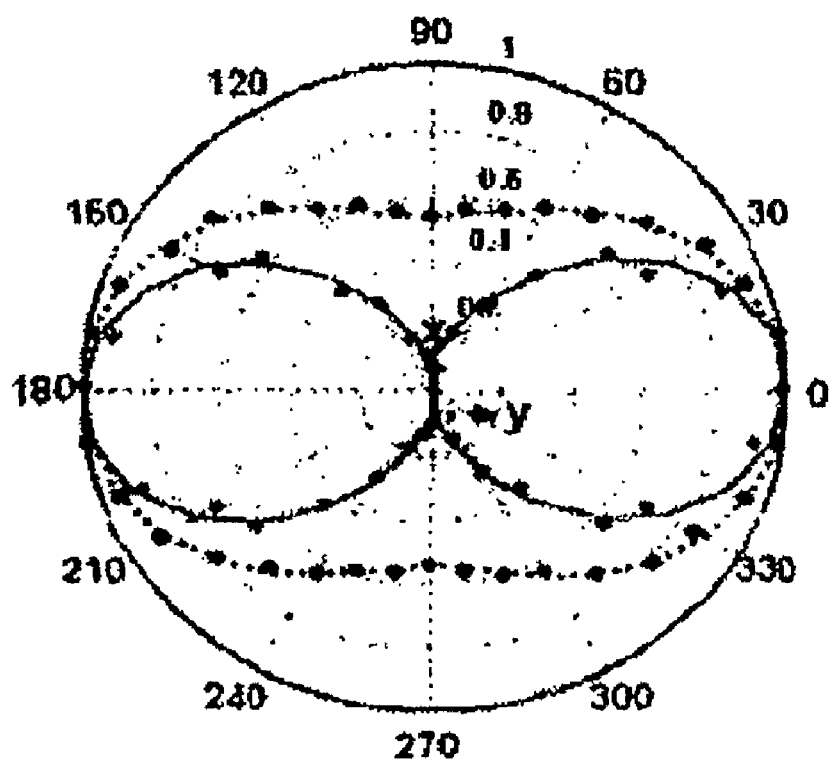
FIG. 7A is an angular intensity pattern for a fiber laser showing the dependence of laser emission intensity for different pump radiation polarization.
Figure 7B:
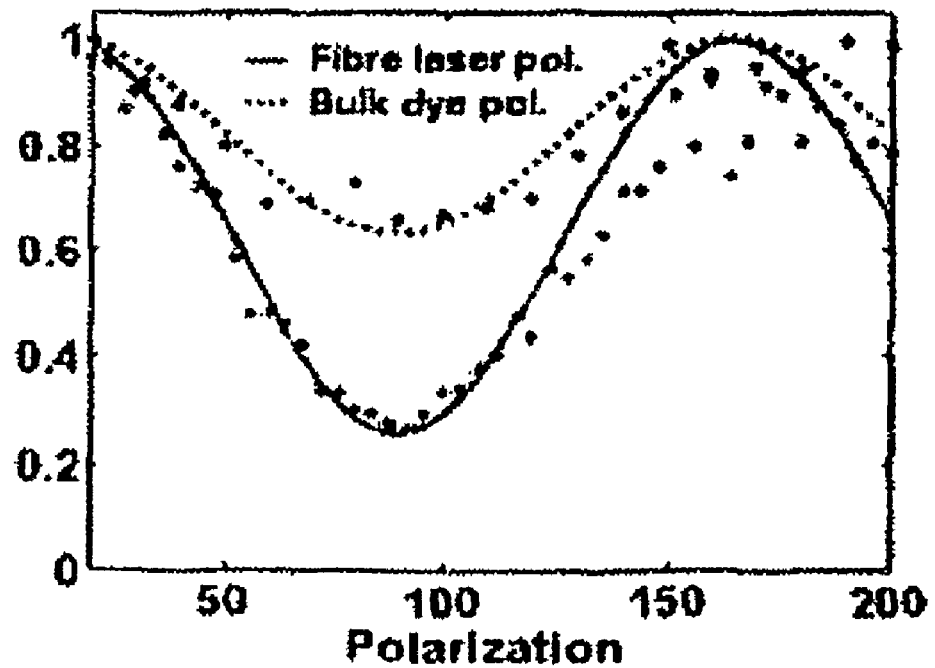
FIG. 7B is a plot showing laser emission intensity as a function of analyzer orientation.

Referring to FIGS. 7A and 7B, the geometrical dependence of the laser emission from the fiber laser using LDS698 as its gain medium is shown. FIG. 7A shows an angular intensity pattern of the laser in comparison to the bulk dye. For this measurement, the detector was maintained at a constant position with respect to the fiber, and the orientation of the pump radiation polarization state was rotated through 360°. FIG. 7B shows the polarization dependence of the laser emission measured with the detector at a fixed position with respect to the fiber. Here, the pump radiation polarization was maintained constant while the pass axis of an analyzer was rotated. Polarization of the light emitted by the bulk dye is also shown. The degree of polarization of the laser emission was measured to be 0.6 while the degree of polarization of the bulk dye emission was 0.22.

A number of embodiments have been described. Other embodiments are in the claims.

What is claimed is:

1. An article, comprising:
   a fiber waveguide extending along a waveguide axis, the fiber waveguide comprising: a core extending along the waveguide axis; and
   a confinement region surrounding the core, the confinement region being configured to guide radiation at a first wavelength, $\lambda_1$, along the waveguide axis and being configured to transmit at least some of the radiation at a second wavelength, $\lambda_2$, incident on the confinement region along a path, where $\lambda_1$ and $\lambda_2$ are different,
   wherein the core comprises a core material selected to interact with radiation at $\lambda_1$ to produce radiation at $\lambda_2$ and the fiber waveguide is configured to provided stimulated emission of radiation at $\lambda_2$ in a direction orthogonal to the waveguide axis when radiation of sufficient power at $\lambda_1$ is directed to the core.

2. The article of claim 1, wherein the stimulated emission is asymmetric with respect to the waveguide axis when the radiation at $\lambda_2$ directed to the core is linearly polarized.

3. The article of claim 2, wherein the asymmetric emission has a dipole-shaped intensity pattern with respect to the waveguide axis.

4. The article of claim 1, wherein the stimulated emission occurs along a portion of the fiber waveguide that extends about $10\lambda_2$ or more along the waveguide axis.

5. The article of claim 1, wherein the stimulated emission occurs along a portion of the fiber waveguide that extends about 1 mm or more along the waveguide axis.

6. The article of claim 1, wherein the core has a diameter in a range from 1 μm to about 1,000 μm.

7. The article of claim 1, wherein the core is configured to support one or more cavity modes at wavelengths at or near $\lambda_2$.

8. The article of claim 7, wherein the article has a quality factor, Q, of about 500 or more for at least one of the modes.

9. The article of claim 1, wherein the confinement region has a plurality of high refractive index regions alternating with low refractive index regions in a direction orthogonal to the waveguide axis.

10. The article of claim 9, wherein the plurality of low refractive index regions correspond to holey portions of the confinement regions.

11. The article of claim 9, wherein the plurality of alternating high and low refractive index portions correspond to alternating layers of a first material and a second material, the first material having a high refractive index and the second material having a low refractive index.

12. The article of claim 11, wherein the alternating layers define a structure having a spiral cross section with respect to the waveguide axis.

13. The article of claim 12, wherein the spiral structure comprises a multilayer structure comprising at least two layers of the different materials encircling the core multiple times.

14. The article of claim 1, wherein the confinement region is configured to provide a photonic band gap for radiation at $\lambda_1$.

15. The article of claim 1, wherein the confinement region is configured to reflect sufficient radiation at $\lambda_2$ to provide sufficient optical feedback for lasing at $\lambda_2$ when radiation of sufficient power at $\lambda_1$ is directed to the core.

16. The article of claim 1, wherein $\lambda_1$ and $\lambda_2$ are in a range from about 300 nm to about 15,000 nm.

17. The article of claim 1, wherein the core material comprises a gain medium.

18. The article of claim 17, wherein the gain medium is an organic material.

19. The article of claim 17, wherein the gain medium comprises a dye.

20. The article of claim 17, wherein the core material comprises a matrix material and the gain medium is dispersed in the matrix material.

21. The article of claim 20, wherein the matrix material is a polymer.

22. The article of claim 1, wherein the core material is a solid material at room temperature.

23. The article of claim 1, wherein the core material is a fluid at room temperature.

24. The article of claim 1, wherein the fiber waveguide comprises segments where the core is devoid of the core material.

25. The article of claim 1, further comprising a light source configured to produce radiation at $\lambda_1$ and arranged to direct the radiation at $\lambda_1$ into the core.

26. The article of claim 25, wherein the light source is a laser light source.

27. A method, comprising:
providing a fiber waveguide configured to guide radiation at a wavelength $\lambda_1$ along a waveguide axis, the fiber waveguide comprising a core extending along the waveguide axis having a core material selected to interact with radiation at $\lambda_1$ to produce radiation at $\lambda_2$; and
directing radiation at $\lambda_1$ into the core at an intensity sufficient to cause emission of radiation at $\lambda_2$ from the fiber waveguide in a direction orthogonal to the waveguide axis.

28. The method of claim 27, further comprising moving the position of a gain medium in the fiber to vary the position in the fiber which emits the radiation at $\lambda_2$.

* * * * *

UNITED STATES PATENT AND TRADEMARK OFFICE
CERTIFICATE OF CORRECTION

PATENT NO. : 7,970,022 B2  Page 1 of 1
APPLICATION NO. : 12/161129
DATED : June 28, 2011
INVENTOR(S) : Ofer Shapira et al.

It is certified that error appears in the above-identified patent and that said Letters Patent is hereby corrected as shown below:

On the Title Page, Item (75) Inventors: delete "Cambridge" and insert --Brookline--.

On the Title Page, after "Prior Publication Data" Item (65), insert section

--Related U.S. Application Data

(60) Provisional application No. 60/760,519, filed on January 20, 2006.--

Signed and Sealed this
Fifteenth Day of November, 2011

David J. Kappos
*Director of the United States Patent and Trademark Office*